(12) United States Patent
Jai

(10) Patent No.: US 9,100,441 B2
(45) Date of Patent: Aug. 4, 2015

(54) RECOGNIZING AN INSTALLATION POSITION OF A NETWORK DEVICE ACCORDING TO AN INTERNET PROTOCOL (IP) ADDRESS THROUGH A NETWORK DEVICE INSTALLATION POSITION TABLE AND AN IP ADDRESS ASSIGNING TABLE

(75) Inventor: Ben-Chiao Jai, Taoyuan Hsien (TW)

(73) Assignee: Hope Bay Technologies, Inc., Taipei (TW)

( * ) Notice: Subject to any disclaimer, the term of this patent is extended or adjusted under 35 U.S.C. 154(b) by 67 days.

(21) Appl. No.: 13/372,679

(22) Filed: Feb. 14, 2012

(65) Prior Publication Data

US 2013/0091255 A1    Apr. 11, 2013

(30) Foreign Application Priority Data

Oct. 6, 2011   (TW) .............................. 100136312 A

(51) Int. Cl.
*G06F 15/177* (2006.01)
*H04L 29/12* (2006.01)
*H04L 12/24* (2006.01)

(52) U.S. Cl.
CPC ............ *H04L 61/2015* (2013.01); *H04L 61/10* (2013.01); *H04L 61/609* (2013.01); *H04L 41/0213* (2013.01)

(58) Field of Classification Search
CPC ................. H04L 61/20–61/2015; H04L 41/00; H04L 41/0803; H04L 41/0806
USPC ....................................... 709/220–222; 710/9
See application file for complete search history.

(56) References Cited

U.S. PATENT DOCUMENTS

| | | | | |
|---|---|---|---|---|
| 5,835,725 | A * | 11/1998 | Chiang et al. ................. | 709/228 |
| 6,128,664 | A * | 10/2000 | Yanagidate et al. .......... | 709/228 |
| 6,145,126 | A * | 11/2000 | Matsukura et al. ........... | 717/173 |
| 6,269,377 | B1 * | 7/2001 | Collie et al. ........................... | 1/1 |
| 6,457,007 | B1 * | 9/2002 | Kikuchi et al. ........................ | 1/1 |
| 6,590,877 | B1 * | 7/2003 | Yamakita ....................... | 370/329 |
| 6,618,757 | B1 * | 9/2003 | Babbitt et al. ................ | 709/226 |
| 6,982,953 | B1 * | 1/2006 | Swales .......................... | 370/218 |
| 7,729,340 | B2 * | 6/2010 | Kumai .......................... | 370/352 |
| 7,792,942 | B1 * | 9/2010 | Regan et al. .................. | 709/223 |
| 7,808,992 | B2 * | 10/2010 | Homchaudhuri et al. .... | 370/392 |

(Continued)

OTHER PUBLICATIONS

Terry Slattery: "IP Address Management—What do you use?", Jan. 27, 2011), pp. 1-2, XP055050221.

(Continued)

*Primary Examiner* — Lance L Barry
(74) *Attorney, Agent, or Firm* — Novak Druce Connolly Bove + Quigg LLP

(57) ABSTRACT

An IP address assigning method is provided. Firstly, an IP address request packet containing a media access control address is transmitted to a DHCP server. The IP address request packet is analyzed, so that the media access control address is acquired. Then, at least one address forwarding table of at least one network switch is acquired. Then, the address forwarding table is analyzed according to the media access control address, so that an assigned number of a port of the network switch is acquired. Then, a predetermined IP address listed in an IP address assigning table is assigned to the network device according to the assigned number of the port of the network switch. Afterwards, the media access control address and/or the assigned IP address is recorded in a field of the IP address assigning table corresponding to the assigned number of the port of the network switch.

13 Claims, 4 Drawing Sheets

(56) References Cited

U.S. PATENT DOCUMENTS

| | | | |
|---|---|---|---|
| 7,818,482 B2* | 10/2010 | Shimozawa et al. | 710/72 |
| 7,864,704 B2* | 1/2011 | Lee et al. | 370/254 |
| 7,912,958 B2* | 3/2011 | Giglio et al. | 709/227 |
| 7,929,535 B2* | 4/2011 | Chen et al. | 370/392 |
| 8,125,926 B1* | 2/2012 | Kompella | 370/254 |
| 8,261,118 B2* | 9/2012 | Calo et al. | 713/340 |
| 8,433,779 B2* | 4/2013 | Kumagai et al. | 709/220 |
| 8,645,509 B2* | 2/2014 | Carriere | 709/220 |
| 2002/0052960 A1* | 5/2002 | Trisno et al. | 709/226 |
| 2003/0125815 A1* | 7/2003 | Ghanime et al. | 700/1 |
| 2004/0143654 A1* | 7/2004 | Poirot et al. | 709/223 |
| 2004/0220779 A1* | 11/2004 | Fukao | 702/188 |
| 2005/0188067 A1* | 8/2005 | Kawashima | 709/223 |
| 2007/0262863 A1* | 11/2007 | Aritsuka et al. | 340/539.22 |
| 2008/0301269 A1* | 12/2008 | Shi | 709/220 |
| 2008/0301273 A1* | 12/2008 | Brown et al. | 709/222 |
| 2009/0196290 A1* | 8/2009 | Zhao et al. | 370/392 |
| 2009/0210427 A1* | 8/2009 | Eidler et al. | 707/10 |
| 2009/0219536 A1* | 9/2009 | Piazza | 356/445 |
| 2010/0250715 A1* | 9/2010 | Shigeta et al. | 709/220 |
| 2011/0316426 A1* | 12/2011 | Iwanami et al. | 315/151 |
| 2012/0039612 A1* | 2/2012 | Piazza | 398/118 |
| 2012/0066356 A1* | 3/2012 | Nguyen et al. | 709/220 |
| 2013/0091255 A1* | 4/2013 | Jai | 709/220 |

OTHER PUBLICATIONS

Brad Hedlund: "Top of Rack vs End of Row Data Center Designs", Apr. 5, 2009, pp. 1-29, XP055050364.

* cited by examiner

RECOGNIZING AN INSTALLATION POSITION OF A NETWORK DEVICE ACCORDING TO AN INTERNET PROTOCOL (IP) ADDRESS THROUGH A NETWORK DEVICE INSTALLATION POSITION TABLE AND AN IP ADDRESS ASSIGNING TABLE

FIELD OF THE INVENTION

The present invention relates to an IP address assigning method, and more particularly to a method for automatically assigning IP addresses in a positioning manner and a data center using such method.

BACKGROUND OF THE INVENTION

With increasing development of information industries and networks, the services provided through networks are becoming more and more appealing in various applications. Recently, the concepts of the cloud computing technology have been emerged, and thus the data center becomes more important. A data center is a facility used to house a plurality of computers and/or servers. For providing intensive network applications, the computers and/or servers should be timely increased, removed or replaced. Consequently, the installation positions of the computers and/or servers in the data center can be effectively and timely adjusted in order to meet the requirements of the increasingly competitive environment.

Generally, the computers and/or servers of the data center are in communication with each other through the network to exchange data. For normally transmitting data through the network, an IP address (Internet Protocol address) is assigned to each of the computers and/or servers according to the Internet protocol. Conventionally, the data center has a DHCP (dynamic host configuration protocol) server for automatically assigning IP addresses to respective computers and/or servers. In such way, the IP addresses can be quickly acquired by corresponding computers and/or servers.

Generally, the assigning method of the DHCP server is performed by referring to the usage statuses of the IP addresses and the available IP addresses (i.e. remaining IP addresses). Although each of the computers and/or servers acquires an IP address and its identity is clearly recognized in the network domain according to the IP address, there is no correlation between the IP address and its installation position in the data center.

In a case that one of the computers and/or servers fails to be normally operated, a management program of the data center may issue a notification message to inform the maintenance worker to repair the damaged computer or server. Since the maintenance worker fails to realize the real installation position of the damaged server of the data center according to the IP address of the damaged server. That is, the damaged server needs to be searched from a great number of servers (e.g. thousands or tens of thousands of servers) of the data center by a skillful maintenance worker. The process of searching the damaged server is time-consuming and labor-intensive.

Therefore, there is a need of providing an improved IP address assigning method and a data center using such method so as to obviated the drawbacks encountered from the prior art.

SUMMARY OF THE INVENTION

The present invention provides an IP address assigning method and a data center using such method. The IP address assigning method is capable of dynamically and automatically assigning IP addresses according to the installation positions of the network devices. In a case that one of the network devices fails to be normally operated, it is not necessary to search the damaged network device from a great number of network devices of the data center by a skillful maintenance worker. According to the IP address of the damaged network device, the management program and the maintenance worker can quickly realize or recognize the installation position of the damaged network device. Consequently, the positioning function is achieved. Moreover, for implementing the IP address assigning method, the labor cost and the technical threshold of the maintenance worker will be largely reduced.

In accordance with an aspect of the present invention, there is provided an IP address assigning method. The IP address assigning method includes the following steps. Firstly, an IP address request packet containing a media access control address is issued from a network device, and the IP address request packet is transmitted to a dynamic host configuration protocol (DHCP) server through a network switch. The IP address request packet is analyzed by the DHCP server, so that the media access control address is acquired. Then, at least one address forwarding table of at least one network switch is acquired by the DHCP server. Then, the at least one address forwarding table is analyzed by the DHCP server according to the media access control address, so that an assigned number of a port of the network switch which is electrically connected with the network device is acquired. Then, an available IP address is assigned to the network device by the DHCP server, or a predetermined IP address listed in an IP address assigning table is assigned to the network device according to the assigned number of the port of the network switch which is electrically connected with the network device. Afterwards, the media access control address and/or the assigned IP address is recorded in a field of the IP address assigning table corresponding to the assigned number of the port of the network switch by the DHCP server. An installation position of the network device is recognized according to the IP address through a network device installation position table and the IP address assigning table.

In accordance with another aspect of the present invention, there is provided a data center. The data center comprises a plurality of network switches, a plurality of network devices, a dynamic host configuration protocol (DHCP) server and a plurality of racks. Each of the racks is installed with at least one network switch and at least one network device. The network switches, the network devices, the DHCP server and the racks are electrically connected with each other through a plurality of data transmission lines to define a local area network. The DHCP server and the network switches are in communication with each other and configured to perform an IP address assigning process comprising: (a) receiving and analyzing an IP address request packet containing a media access control address from one of the network devices requested IP address assign, so that the media access control address is acquired; (b) acquiring at least one address forwarding table of the network switch; (c) analyzing the address forwarding table according to the media access control address, thereby acquiring an assigned number of a port of the network switch which is electrically connected with the network device; (d) assigning an available IP address to the network device, or assigning a predetermined IP address listed in an IP address assigning table to the network device according to the assigned number of the port of the network switch which is electrically connected with the network device; and (e) recording the media access control address and/or the assigned IP address in a field of the IP address assigning table corresponding to the assigned number of the port of the network switch. An installation position of the network device is recognized according to the IP address through a network device installation position table and the IP address assigning table.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
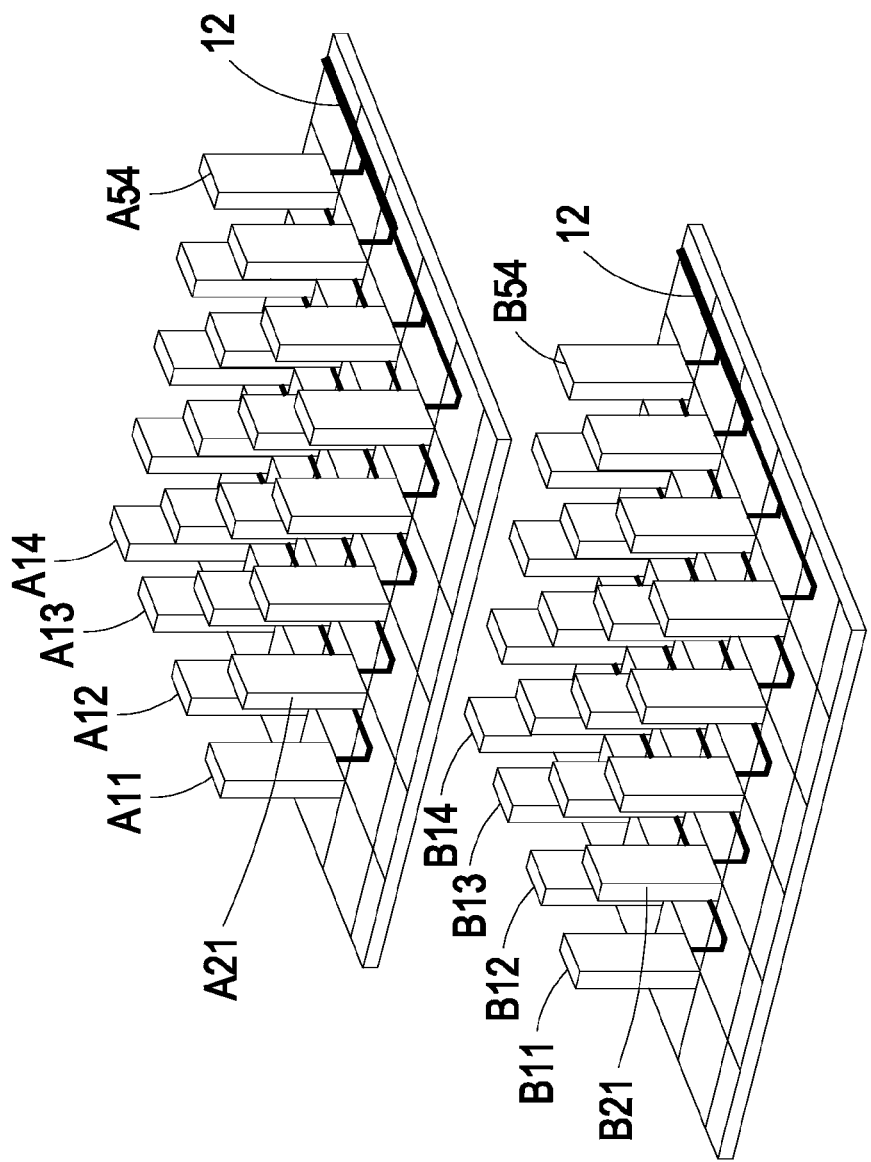
FIG. 1 schematically illustrates the architecture of a data center according to an embodiment of the present invention.

FIG. 1 schematically illustrates the architecture of a data center according to an embodiment of the present invention. As shown in FIG. 1, the data center 1 has multilayered building spaces (e.g. two-layered building spaces). For example, a plurality of racks A11~A54 are located within the second layer of the building space, and a plurality of racks B11~B54 are located within the first layer of the building space. The racks in each layer of the building spaces are arranged or located in an array. The installation positions are denoted by the numerals A11~A54 and B11~B54. Moreover, the network switches within respective racks are in communication with each other through a plurality of data transmission lines 12 (e.g. Ethernet lines or fiber-optic cables). The network devices within the racks A11~A54 and B11~B54 are in communication with each other to exchange digital data and provide various Internet services (e.g. Web server or FTP server).

Figure 2:
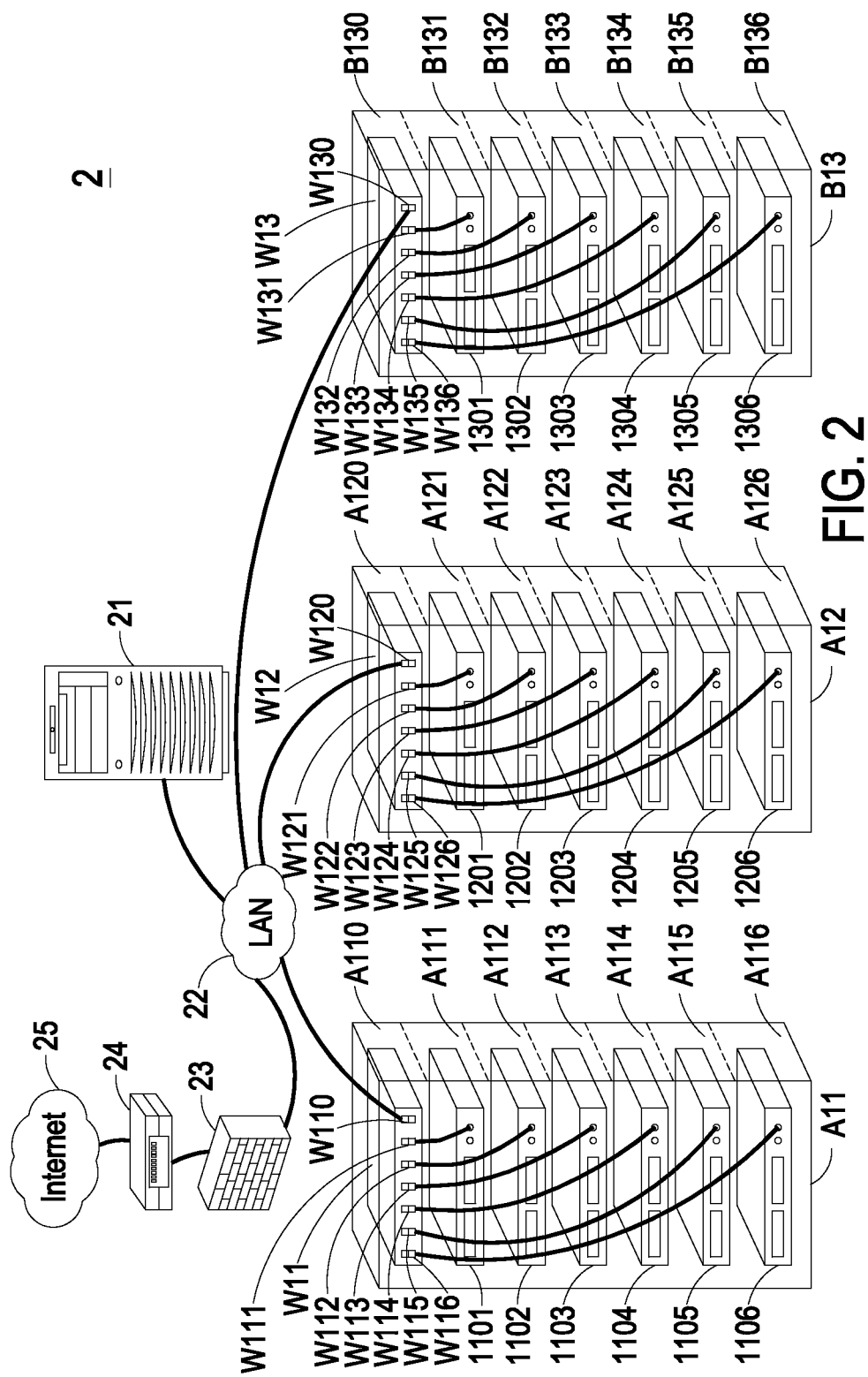
FIG. 2 schematically illustrates the architecture of a data center using an IP address assigning method according to an embodiment of the present invention.

FIG. 2 schematically illustrates the architecture of a data center using an IP address (Internet Protocol address) assigning method according to an embodiment of the present invention. As shown in FIG. 2, the data center 2 includes a plurality of network switches W11~W13, a plurality of servers (e.g. network devices or IT equipments) 1101~1306, a DHCP (dynamic host configuration protocol) server 21, and a plurality of racks A11, A12, B13. The servers 1101~1106, 1201~1206 and 1301~1306 are disposed within the racks A11, A12 and B13, respectively. Each of these racks contains at least one network switch. In this embodiment, the network switches W11, W12 and W13 are disposed within first receiving spaces A110, A120, B130 of the racks A11, A12, B13, respectively. In addition, each of the racks A11, A12 and B13 contains six servers, but it is not limited thereto. In this embodiment, the network devices are illustrated by referring to the servers. Nevertheless, the network devices may be network switches other than the network switches W11~W13.

In this embodiment, the DHCP server 21 is in communication with the network switches W11, W12 and W13 through data transmission lines (e.g. Ethernet lines or fiber-optic cables), thereby collectively defining a first local area network 22. According to the installation positions of the servers 1101~1306 (network devices or IT equipments), IP addresses are assigned to corresponding servers by the DHCP server 21. Consequently, these servers 1101~1306 within the racks A11, A12, B13 are in communication with each other to exchange digital data and provide various Internet services (e.g. Web server or FTP server). Each of the network switches W11, W12 and W13 within the racks A11, A12 and B13 comprises a plurality of ports. The relationship between the ports of the network switches W11, W12 and W13 and respective servers (network devices or IT equipments) are determined according to an IP address assigning table recorded in the DHCP server 21.

From top to bottom, the servers 1101~1106 are respectively accommodated within the receiving spaces A111~A116 of the first rack A11. The ports W111~W116 of the first network switch W11 are electrically connected with the servers 1101~1106 of the first rack A11, sequentially and respectively. Similarly, from top to bottom, the servers 1201~1206 are respectively accommodated within the receiving spaces A121~A126 of the second rack A12. The ports W121~W126 of the second network switch W12 are electrically connected with the servers 1201~1206 of the second rack A12, sequentially and respectively. Similarly, from top to bottom, the servers 1301~1306 are respectively accommodated within the receiving spaces B131~A136 of the second rack B13. The ports W131~W136 of the third network switch W13 are electrically connected with the servers 1301~1306 of the second rack B13, sequentially and respectively.

In this embodiment, the data center 2 further comprises a firewall 23 and a router 24. The firewall 23 and the router 24 are located between the first local area network 22 and the Internet 25. According to some preset network safety regulations, the data packets transmitted between the first local area network 22 and the Internet 25 are managed by the firewall 23. Since the data packets transmitted between the first local area network 22 and the Internet 25 are analyzed, filtered and managed by the firewall 23, the management and safety of the network system (i.e. the first local area network 22) of the data center 2 are enhanced. The router 24 is used for performing an IP forwarding process to determine the path of transmitting the packet data between the first local area network 22 and the Internet 25. During operations, the router 24 determines the best path to send a data packet to its intended destination according to a route table recorded in the router 24. That is, the IP forwarding process allows the router 24 to select the best path to send the data packet.

Please refer to Table 1 and Table 2. Table 1 is a network device installation position table showing the positions of the network devices (servers) included in the data center according to the embodiment of the present invention. Table 2 is an exemplary IP address assigning table. In this embodiment, the network device installation position table (Table 1) and the IP address assigning table (Table 2) are stored in the DHCP server 21. The network device installation position table records the relationships between the ports of the network switches and the installation position of the corresponding network devices (servers). The IP address assigning table records the relationships between the IP addresses and the media access control (MAC) addresses of the ports of the network switches and the corresponding network devices (servers). In this embodiment, for establishing the data center 2, the network switches W11~W13 and the servers (network devices) 1101~1306 are installed at the installation positions by referring to the network device installation position table (Table 1) and then these devices are electrically connected with each other.

TABLE 1 network device installation position table

| Network switch W11 W11(@A110) | | Network switch W12 W12(@A120) | | Network switch W13 W13(@B130) | |
|---|---|---|---|---|---|
| Port | Location | Port | Location | Port | Location |
| 1 | A111 | 1 | A121 | 1 | B131 |
| 2 | A112 | 2 | A122 | 2 | B132 |
| 3 | A113 | 3 | A123 | 3 | B133 |
| 4 | A114 | 4 | A124 | 4 | B134 |
| 5 | A115 | 5 | A125 | 5 | B135 |
| 6 | A116 | 6 | A126 | 6 | B136 |

TABLE 2

IP address assigning table

| Network switch W11 W11(@A110) | | | Network switch W12 W12(@A120) | | | Network switch W13 W13(@B130) | | |
|---|---|---|---|---|---|---|---|---|
| Port | IP | MAC | Port | IP | MAC | Port | IP | MAC |
| 1 | 192.168.0.1 | Not logged in | 1 | 192.168.0.11 | Not logged in | 1 | 192.168.0.21 | Not logged in |
| 2 | 192.168.0.2 | Not logged in | 2 | 192.168.0.12 | Not logged in | 2 | 192.168.0.22 | Not logged in |
| 3 | 192.168.0.3 | Not logged in | 3 | 192.168.0.13 | Not logged in | 3 | 192.168.0.23 | Not logged in |
| 4 | 192.168.0.4 | Not logged in | 4 | 192.168.0.14 | Not logged in | 4 | 192.168.0.24 | Not logged in |
| 5 | 192.168.0.5 | Not logged in | 5 | 192.168.0.15 | Not logged in | 5 | 192.168.0.25 | Not logged in |
| 6 | 192.168.0.6 | Not logged in | 6 | 192.168.0.16 | Not logged in | 6 | 192.168.0.26 | Not logged in |

For example, the server 1101 is disposed within the second receiving space A111 of the rack A11, which is located at the first-row and first-column installation position within the second-layer building space of the data center 2. In addition, the server 1101 is electrically connected with the first port W111 of the first network switch W11 within the first rack A11. Similarly, the server 1305 is disposed within the sixth receiving space B135 of the rack B13, which is located at the first-row and third-column installation position within the first-layer building space of the data center 2. In addition, the server 1305 is electrically connected with the fifth port W135 of the third network switch W13 within the third rack B13.

Figure 3:
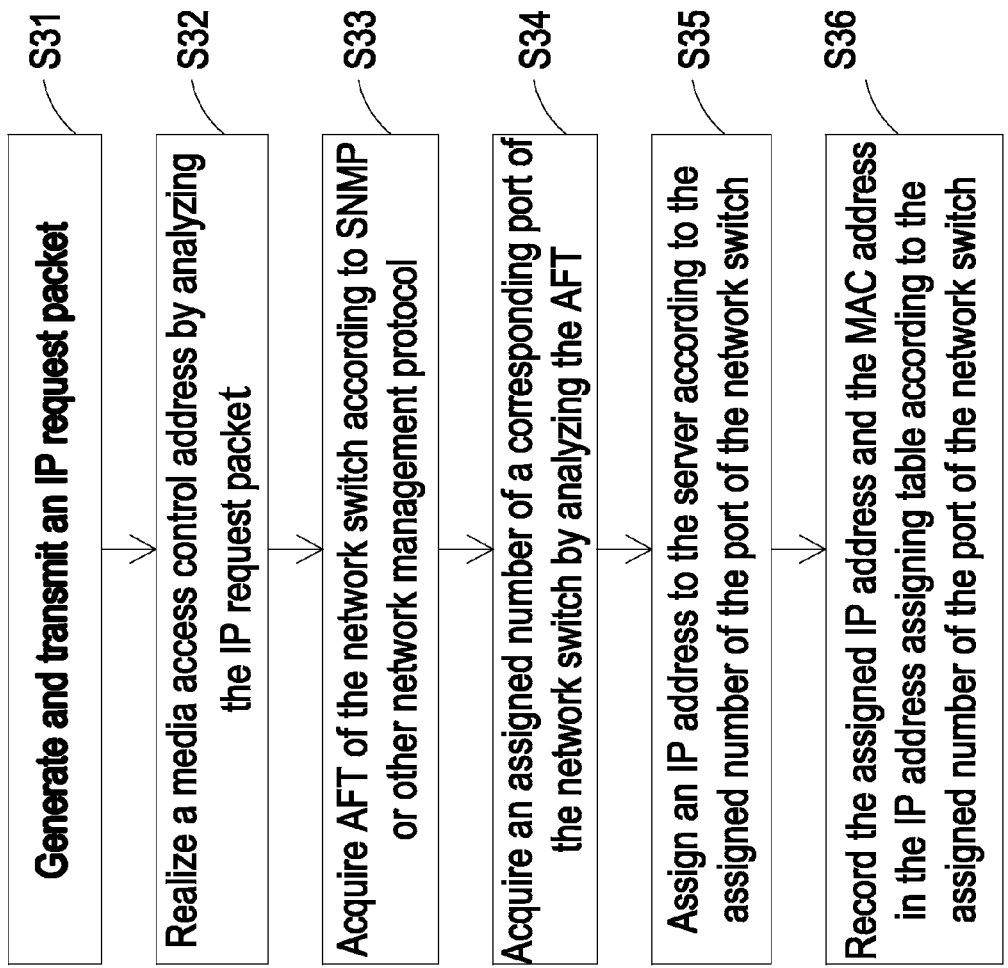
FIG. 3 is a flowchart illustrating an IP address assigning method according to an embodiment of the present invention.

Hereinafter, an IP address assigning method will be illustrated with reference to the flowchart of FIG. 3 as well as FIGS. 1 and 2 and Tables 1 and 2. In a case that the servers 1101~1306 are replaced, booted or reset, the IP addresses of the servers 1101~1306 should be acquired. Firstly, in the step S31, IP address request packets containing media access control (MAC) addresses are generated by the servers 1101~1306. The IP address request packets are transmitted form the servers 1101~1306 to the DHCP server 21 through corresponding ports W111~W136 of the network switches W11~W13 in order to request the DHCP server 21 to assign IP addresses.

Then, in the Step S32, the IP address request packets are analyzed by the DHCP server 21, so that the media access control (MAC) addresses generated by the servers 1101~1306 are realized. Then, in the step S33, the address forwarding tables (AFT) of the network switches W11~W13 are acquired by the DHCP server 21 according to a simple network management protocol (SNMP) or other network management protocol.

The address forwarding table (AFT) records the media access control (MAC) addresses contained in the data packets which are inputted into or outputted from all ports of each network switch. In the step S34, the address forwarding tables (AFT) of the network switches W11~W13 are analyzed by the DHCP server 21 according to the media access control (MAC) addresses contained in the IP address request packets. Consequently, the assigned numbers of the ports of the network switches that are electrically connected with the servers 1101~1306 (i.e. the servers issuing the IP address request packets) are acquired.

Then, in the step S35, the DHCP server 21 assigns IP addresses to the servers 1101~1306 that issue the IP assignment requests. There are two approaches to implement the step S35. In a first approach, available IP addresses are successively assigned to the servers 1101~1306 that issue the IP assignment requests. In the second approach, predetermined IP addresses listed in the IP address assigning table (i.e. Table 2) are assigned to the servers 1101~1306 that issue the IP assignment requests according to the assigned numbers of the ports of the network switches.

After the IP addresses are assigned, the DHCP server 21 will record the assigned IP addresses and/or the MAC addresses of the servers 1101~1306 in the fields of the IP address assigning table (i.e. Table 2) corresponding to the assigned numbers of the ports of the network switches (Step S36).

Figure 4:
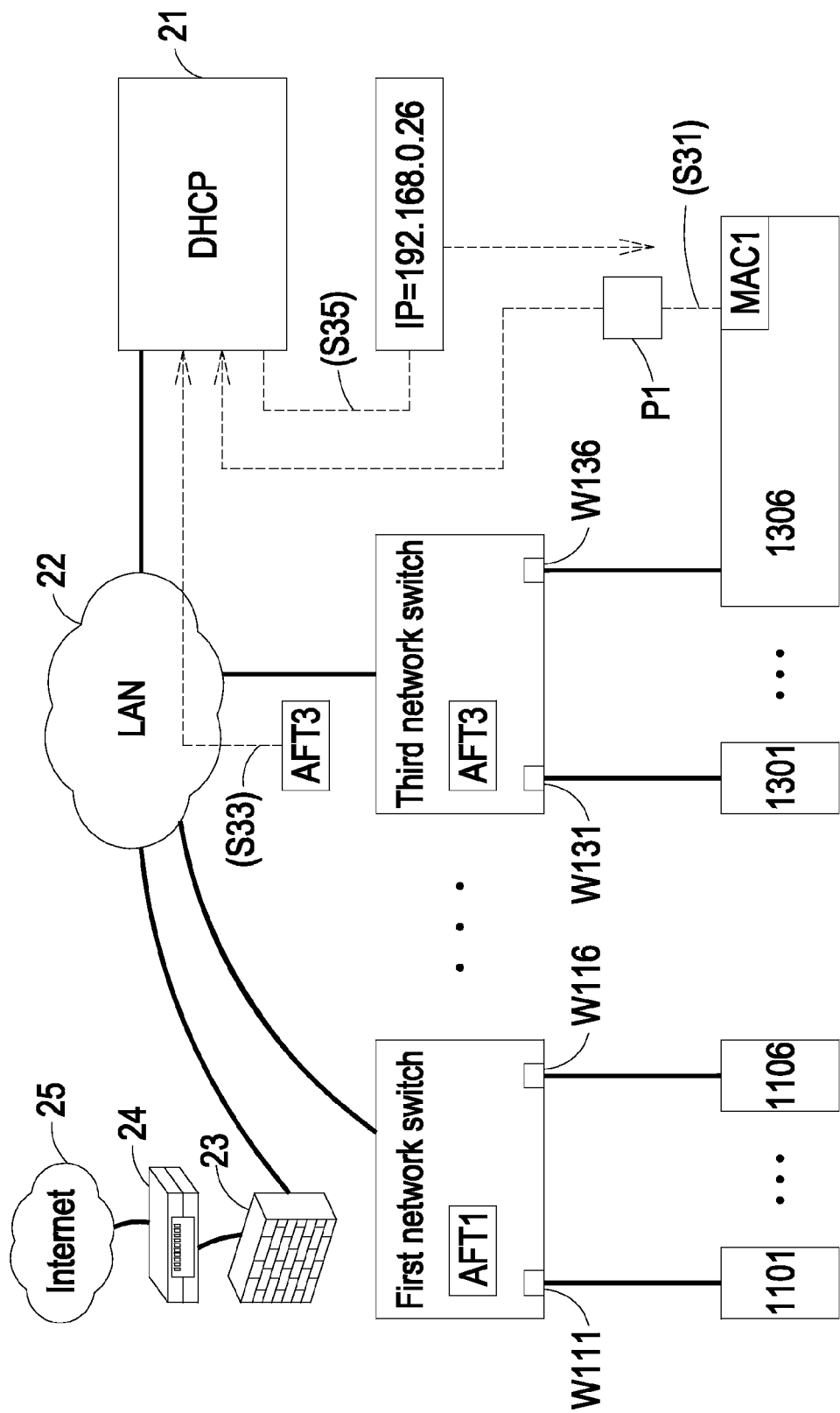
FIG. 4 schematically illustrates the data center using an IP address assigning method and the flow path of the IP address assigning method according to an embodiment of the present invention.

FIG. 4 schematically illustrates the data center using an IP address assigning method and the flow path of the IP address assigning method according to an embodiment of the present invention. For facilitating understanding the present invention, an implementation example of the IP address assigning method will be illustrated with reference to FIGS. 1~4 and Tables 1~2. For example, in a case that the server 1306 is replaced, reset or booted, the IP address of the server 1306 needs to be acquired. Firstly, in the step S31, an IP address request packet P1 containing a first media access control address MAC1 is generated by the server 1306. The IP address request packet P1 is transmitted to the DHCP server 21 through the sixth port W136 of the third network switch W13 in order to request the DHCP server 21 to assign the IP address.

Then, in the Step S32, the IP address request packet P1 is analyzed by the DHCP server 21, so that the first media access control address MAC1 of the server 1306 is realized. Then, in the step S33, the address forwarding table AFT3 of the third network switch W13 is acquired by the DHCP server 21 according to a simple network management protocol (SNMP).

The IP address request packet P1 is transmitted to the DHCP server 21 through the sixth port W136 of the network switch W13. Consequently, the address forwarding table AFT3 of the third network switch W13 records the information about the transmission of the IP address request packet P1 including the first media access control address MAC1 through the sixth port W136 of the third network switch W13. In the step S34, the address forwarding table AFT3 of the third network switch W13 is analyzed by the DHCP server 21 according to the first media access control address MAC1, so that the assigned number of the sixth port W136 of the third network switch W13 is acquired. That is, the DHCP server 21 can recognize that the server 1306 is electrically connected with the sixth port W136 of the third network switch W13.

Then, in the step S35, the DHCP server 21 assigns an IP address to the server 1306 according to the assigned numbers of the port of the network switch. There are two approaches to implement the step S35. In a first approach, an available IP address (192.168.0.26) is assigned to the server 1306 by the DHCP server 21. In the second approach, a predetermined IP address (192.168.0.26) listed in the IP address assigning table (i.e. Table 2) is assigned to the server 1306 according to the assigned number of the sixth port W136 of the third network switch W13.

After the IP addresses are assigned, the DHCP server 21 will record the assigned IP address (192.168.0.26) and/or the first media access control address MAC1 (e.g. 00-16-EC-E9-FF-A7) of the server 1306 in the fields of the IP address assigning table (i.e. Table 2) corresponding to the sixth port W136 of the third network switch W13 (Step S36).

Table 3 is another exemplary IP address assigning table. Please refer to Tables 1, 2 and 3. After the IP addresses of all servers 1101~1306 are acquired by the above procedure, the assigned IP addresses (192.168.0.1~192.168.0.26) and the MAC addresses corresponding to the ports of the network switches W11~W13 are recorded in the IP address assigning table.

In a case that one of the network devices (servers 1101~1306) of the data center 2 is damaged and fails to be normally operated, a management program of the data center may issue a notification message to inform the maintenance worker to repair the damaged network device. Moreover, according to the IP address of the damaged network device in the network device installation position table and the IP address assigning table, the management program and the maintenance worker can quickly recognize the installation position of the damaged network device. Consequently, the positioning function is achieved.

TABLE 3

IP address assigning table

| First network switch W11 W11(@A110) | | | Second network switch W12 W12(@A120) | | | Third network switch W13 W13(@B130) | | |
|---|---|---|---|---|---|---|---|---|
| Port | IP | MAC | Port | IP | MAC | Port | IP | MAC |
| 1 | 192.168.0.1 | MAC18 | 1 | 192.168.0.11 | MAC7 | 1 | 192.168.0.21 | MAC4 |
| 2 | 192.168.0.2 | MAC13 | 2 | 192.168.0.12 | MAC10 | 2 | 192.168.0.22 | MAC3 |
| 3 | 192.168.0.3 | MAC17 | 3 | 192.168.0.13 | MAC11 | 3 | 192.168.0.23 | MAC5 |
| 4 | 192.168.0.4 | MAC14 | 4 | 192.168.0.14 | MAC8 | 4 | 192.168.0.24 | MAC6 |
| 5 | 192.168.0.5 | MAC16 | 5 | 192.168.0.15 | MAC12 | 5 | 192.168.0.25 | MAC2 |
| 6 | 192.168.0.6 | MAC15 | 6 | 192.168.0.16 | MAC9 | 6 | 192.168.0.26 | MAC1 |

From the above description, the IP address assigning method of the present invention is capable of dynamically and automatically assigning IP addresses according to the installation positions of the network devices. In a case that one of the network devices fails to be normally operated, it is not necessary to search the damaged network device from a great number of network devices of the data center by a skillful maintenance worker. According to the IP address of the damaged network device, the management program and the maintenance worker can quickly realize or recognize the installation position of the damaged network device. Consequently, the positioning function is achieved. Moreover, for implementing the IP address assigning method of the present invention, the labor cost and the technical threshold of the maintenance worker will be largely reduced.

Moreover, in the IP address assigning method of the present invention, the address forwarding tables (AFT) of the network switches are acquired by the DHCP server according to a simple network management protocol (SNMP) or other network management protocol. Consequently, the assigned numbers of the ports of the network switches that are electrically connected with and in communication with the network devices (i.e. servers) are recognized. By changing the settings of the DHCP server and establishing or adjusting the network device installation position table and the IP address assigning table, the IP address assigning method of the present invention may be easily implemented and applied to the data center in a cost-effective manner.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An internet protocol (IP) address assigning method, comprising steps of:
   (a) issuing an IP address request packet containing a media access control address from at least one network device, and transmitting said IP address request packet to a dynamic host configuration protocol (DHCP) server through at least one network switch;
   (b) analyzing said IP address request packet by said DHCP server, so that said media access control address is acquired;
   (c) acquiring at least one address forwarding table of said at least one network switch by said DHCP server;
   (d) analyzing said at least one address forwarding table by said DHCP server according to said media access control address, thereby acquiring an assigned number of a port of said network switch which is electrically connected with said network device;
   (e) assigning an available IP address to said network device by said DHCP server, or assigning a predetermined IP address listed in an IP address assigning table to said network device according to said assigned number of said port of said network switch which is electrically connected with said network device; and
   (f) recording said media access control address and/or said assigned IP address in a field of said IP address assigning table corresponding to said assigned number of said port of said network switch by said DHCP server after the IP address is assigned,
   wherein an installation position of said network device is recognized according to said IP address through a network device installation position table and said IP address assigning table, and the installation position of said network device represents a detailed position of said network device in a data center which comprises a receiving space, a rack, and a layered building space;
   wherein said network device is installed at the installation position by referring to said network device installation position table.

2. The IP address assigning method according to claim 1, wherein in said step (c), said at least one address forwarding table is acquired by said DHCP server according to a simple network management protocol (SNMP).

3. The IP address assigning method according to claim 1, wherein a relationship between said port of said network switch and said installation position of said network device electrically connected thereof is recorded in said network device installation position table, wherein said network device installation position table and said IP address assigning table are stored in said DHCP server.

4. The IP address assigning method according to claim 1, wherein said network device is another network switch and/or a server.

5. The IP address assigning method according to claim 4, wherein said server is a Web server or FTP server.

6. The IP address assigning method according to claim 1, wherein said IP address assigning method is further implemented in the data center, wherein said data center comprises a plurality of network switches, a plurality of network devices, said DHCP server and a plurality of racks, which are electrically connected with each other through a plurality of data transmission lines to define a local area network and exchange digital data, wherein at least one network switch and at least one network device are accommodated within one of said racks.

7. The IP address assigning method according to claim 6, wherein said data center further comprises a firewall and a router, which are located between said local area network and an Internet.

8. The IP address assigning method according to claim 6, wherein said data transmission lines are Ethernet lines or fiber-optic cables.

9. A data center, comprising:
   a plurality of network switches;
   a plurality of network devices;
   a dynamic host configuration protocol (DHCP) server; and
   a plurality of racks, each of which is installed with at least one said network switch and at least one said network device;
   wherein said network switches, said network devices, said DHCP server and said racks are electrically connected with each other through a plurality of data transmission lines to define a local area network; and
   wherein the data center uses said DHCP server and said network switches which are in communication with each other to perform an internet protocol (IP) address assigning process comprising:
   (a) receiving and analyzing an IP address request packet containing a media access control address from one of said network devices requested IP address assign, so that said media access control address is acquired;
   (b) acquiring at least one address forwarding table of said network switch;
   (c) analyzing said at least one address forwarding table according to said media access control address, thereby acquiring an assigned number of a port of said network switch which is electrically connected with said network device;
   (d) assigning an available IP address to said network device, or assigning a predetermined IP address listed in an IP address assigning table to said network device according to said assigned number of said port of said network switch which is electrically connected with said network device; and
   (e) recording said media access control address and/or said assigned IP address in a field of said IP address assigning table corresponding to said assigned number of said port of said network switch after the IP address is assigned,
   wherein an installation position of said network device is recognized according to said IP address through a network device installation position table and said IP address assigning table, and the installation position of said network device represents a detailed position of said network device in the data center which comprises a receiving space, a rack, and a layered building space;
   wherein said network device is installed at the installation position by referring to said network device installation position table.

10. The data center according to claim 9, wherein said at least one address forwarding table is acquired by said DHCP server according to a simple network management protocol (SNMP).

11. The data center according to claim 9, wherein a relationship between said port of said network switch and said installation position of said network device electrically connected thereof is recorded in said network device installation position table, wherein said network device installation position table and said IP address assigning table are stored in said DHCP server.

12. The data center according to claim 9, wherein said network device is another network switch and/or a server.

13. The data center according to claim 9, further comprising a firewall and a router, which are located between said local area network and an Internet.

\* \* \* \* \*